United States Patent [19]

Mowery

[11] Patent Number: 5,428,258
[45] Date of Patent: Jun. 27, 1995

[54] ARMATURE FOR AN ELECTRIC MOTOR HAVING A CORE FACE INSULATION DISC

[75] Inventor: John Mowery, Liberty, S.C.

[73] Assignee: Ryobi Motor Products Corp., Easley, S.C.

[21] Appl. No.: 83,370

[22] Filed: Jun. 25, 1993

[51] Int. Cl.⁶ .............................................. H02K 3/34
[52] U.S. Cl. ...................................... 310/215; 310/42
[58] Field of Search ................. 310/42, 215, 216, 217

[56] References Cited

U.S. PATENT DOCUMENTS

| | | |
|---|---|---|
| 3,917,967 | 11/1975 | Robison et al. ............... 310/42 |
| 4,663,835 | 5/1987 | Caillier, Sr. ................... 29/598 |
| 5,304,885 | 4/1994 | Wong et al. .................. 310/216 |

*Primary Examiner*—Thomas M. Dougherty
*Assistant Examiner*—Judson H. Jones
*Attorney, Agent, or Firm*—Brooks & Kushman

[57] ABSTRACT

An armature for an electric motor having a laminated core assembly attached to the motor's shaft. The laminated core having a plurality of coil slots in which the armature coils are wound. A slot liner is disposed in each of the coil slots and an insulating disc is swagged onto the shaft which engages the ends of the slot liners preventing their longitudinal displacement during the winding of the armature coils.

13 Claims, 1 Drawing Sheet

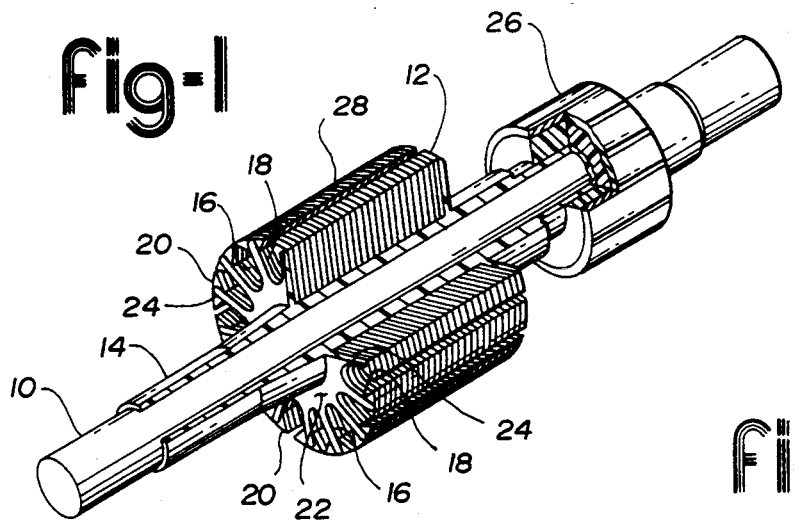
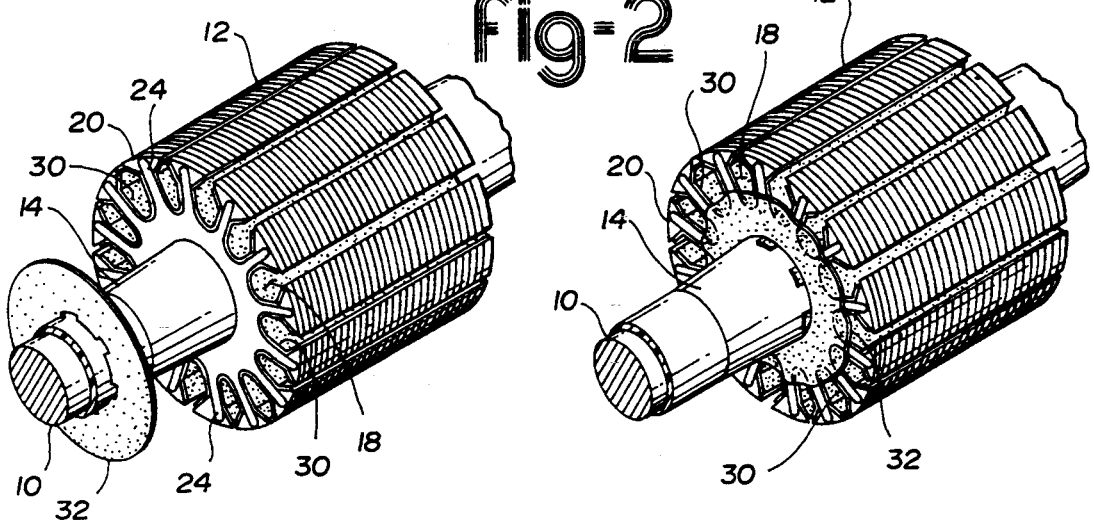
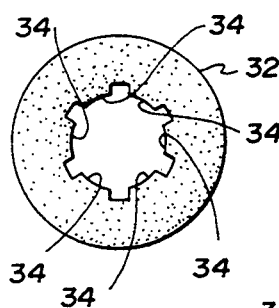
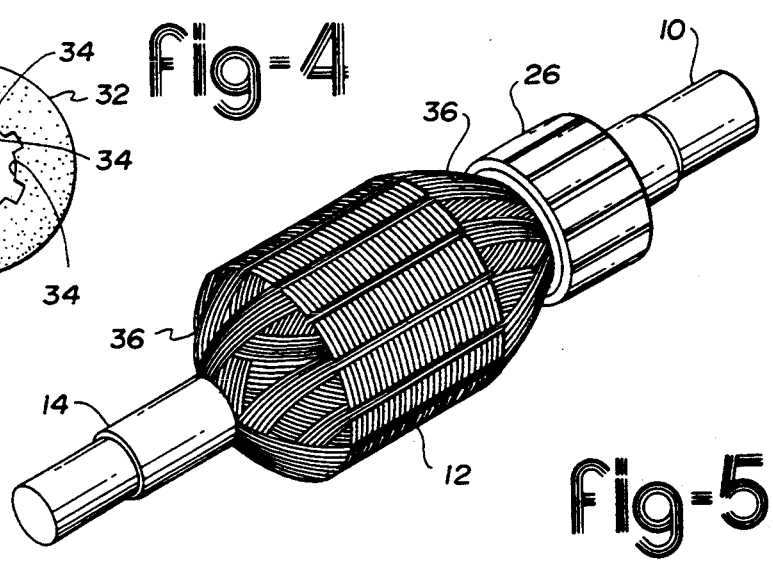

ARMATURE FOR AN ELECTRIC MOTOR HAVING A CORE FACE INSULATION DISC

TECHNICAL FIELD

The invention relates to the field of electric motors and, in particular, to an armature for an electric motor having an insulator disc swagged against the end face of the laminated armature core to reduce electrical breakdown between the armature windings and the armature core.

BACKGROUND ART

Various techniques are currently being used to provide electrical insulation between the winding of the armature coil and the armature core. Perkins, in U.S. Pat. No. 2,831,991 teaches the lamination of the ends of the armature core with insulating laminates which are fabricated separately and require individual handling during assembly.

Studer, in U.S. Pat. No. 2,232,812, discloses an armature insulating arrangement in which layers of insulating material covering each end of the armature core are formed integral with the core slot insulation. This layer of insulating material may be molded separately or molded directly onto the faces of the armature core.

Robison et al, in U.S. Pat. No. 3,917,967, discloses an armature insulation arrangement in which a molded insulating material is applied between the shaft the armature core and against the end faces of the armature coil to a diameter which is approximately equal to the root diameter of the slots in which the coil is wound, while Caillier, Sr., U.S. Pat. No. 4,663,835 teaches applying the insulation along the arms which extend radially on opposite sides of these slots.

As is evidenced by the prior art, a continuous effort is being exerted to improve the electrical insulation between the coil windings and the core on which these coils are wound.

SUMMARY OF THE INVENTION

An armature for an electric motor having a shaft and a laminate core circumscribing the shaft is disclosed. The laminated core having a plurality of radial arms defining a plurality of longitudinal coil slots therebetween. The coil slots have a root end and an open end. A sleeve made of a dielectric material circumscribes the shaft in the region between the shaft and the laminated core and extends a predetermined distance beyond the laminated core on both sides thereof. The sleeve secures the laminated core to the shaft and provides electrical insulation therebetween.

A slot liner made of an insulating material is disposed in each of the coil slots and at least one insulating disc is attached to the sleeve adjacent to one end face of the laminated core. The insulating disc engages each slot liner in the region of the root end of the coil slots prohibiting their longitudinal displacement in one direction.

A commutator is attached to the shaft on the side of the laminated core opposite the insulating disc and a plurality of coil windings connected to the commutator are wound in selected coil slots of the laminated core.

In the preferred embodiment, peripheral regions of the insulating disc are slightly indented into the end openings of the coil slots when the insulating disc is swagged onto the sleeve.

The advantage of the armature assembly is that during the winding of the coils, the occurrence of electrical shorts between the coil and the laminated coil are significantly reduced.

Another advantage is that the addition of the insulating disc on the end face of the laminated core significantly inhibits the displacement of the slot liners during the winding of the laminated core.

These and other improvements will become more apparent from the reading of the specification in conjunction with the drawings.

BRIEF DESCRIPTION OF THE DRAWINGS

FIG. 1 is a partial cross-sectional perspective view of a partially assembled armature;

FIG. 2 is a perspective view of the armature showing the addition of the slot liners and the insulating disc;

FIG. 3 is a perspective view showing the insulating disc swagged against the end face of the laminated core;

FIG. 4 is a top view of the insulating disc; and

FIG. 5 is a perspective view of a completed armature.

DETAILED DESCRIPTION OF THE INVENTION

FIG. 1 shows the structure of a partially assembled armature for an electric motor. The armature is of the type taught by Caillier, Sr. in U.S. Pat. No. 4,663,835 having a shaft 10, a laminated core assembly 12 and an injected molded sleeve 14 which electrically insulates the core assembly 12 from the shaft 10 and secures it thereto. The core assembly 12 has a plurality of radially extending arms 16 defining therebetween a plurality of coil slots 18 which extend through the core assembly parallel to the axis of the shaft 10. The free ends of the radially extending arms 16 may be provided with enlarged heads 20 partially enclosing the open end of the coil slots 18 as shown.

The injection molded sleeve 14 has a pair of radially extended spider flange 22 which engage opposite end faces of the core assembly 12 to lock the core assembly 12 axially relative to the shaft 10. The spider flanges 22 have a radially extending finger 24 secured to the end face of each radial arm 16 as shown. A commutator 26 is attached to the shaft 10 at a location displaced from the core assembly.

The laminated core assembly 12 is constructed of a plurality of individual annular discs 28 made from a soft iron or any other low magnetic reluctance material in a conventional manner. The discs 28 have a central aperture larger than the diameter of shaft 10 and are insulated from each other to reduce the formation of eddy currents as is known in the art. The sleeve 14 is injection molded between the shaft 10 and the core assembly 12 using a thermosetting dielectric material such as a glass-filled polyester and extends beyond the core assembly 12 in both directions along the shaft 10.

As shown in FIG. 2, the assembly of the armature proceeds with the insertion of a slot liner 30 made from a sheet of insulating material in each of the coil slots 18. The contour of the slot liners 30 are shaped to mate with the internal contour of the coil slots 18 including the contours of the enlarged heads 20. To prevent displacement of the slot liners 30 in an axial direction during the winding of the coils on the core assembly, an insulating disc 32 is swagged on the sleeve 12 as shown in FIG. 3. The insulating disc 32 is preferably made from a thin sheet of insulating material such as a sheet of paper having a high fiber content, called rag paper, and may be impregnated or coated with mylar or other plastic material. The insulating disc 32 preferably has an outside diameter selected to engage the edges of the slot liners 40 as shown in FIG. 3. A plurality of arcuate tabs 34 define the internal diameter of the insulating disc 32 which is selected to be less than the diameter of the sleeve 14 adjacent to the core assembly 12 so that the arcuate tabs 34 are deformed when it is swagged against the radial end surface of the laminated core 12. This deformation of the arcuate tabs 34 lock the insulating disc 32 onto the sleeve 14 abutting the radial end surface of the core assembly 12. The insulating disc 32 prevents the longitudinal displacement of the slot liners 30 while the electrical coils are being wound in the slots 18.

The peripheral edge of the swagging tool engaging the insulating disc 32 preferably has a plurality of forming bosses aligned with the slots 18 so that during the swagging process, the edges of the insulating disc 32 in the vicinity of the longitudinal slots 18 are indented a small distance into the slots 18 producing a wavy contour as shown in FIG. 3.

It has been found that the use of the insulating disc 32 at the end of the core assembly 12 opposite the commutator 26 significantly reduces the production failure rate caused by the longitudinal displacement of slot liners 30 during the winding of the core. The longitudinal displacement of one or more of the slot liners 30 during the winding of the core is believed to be a primary cause of the shorting of the wire to the core assembly 12 and other electrical breakdowns.

Although only a single insulating disc 32, swagged to the end of the core assembly 12 on the side opposite the commutator 26 has resulted in a satisfactory solution to the electrical breakdown problem and has reduced the failure rate in the manufacture of armatures, it is recognized that a second insulating disc 32 may also be swagged into the end of the core assembly 12 facing the commutator 26.

A complete armature having electrical coils 36 wound in the slots 18 of the core assembly 12 is shown in FIG. 5.

Having described the invention with reference to the preferred embodiment shown in the figures, it is recognized that those skilled in the art may make certain changes or improvements within the scope of the appended claims.

What is claimed is:

1. An armature for an electric motor comprising:
a shaft having an axis of rotation;
a laminated core circumscribing said shaft, said laminated core having a plurality of radial arms defining a plurality of coil slots therebetween, said coil slots having a root end and an open end;
a dielectric sleeve circumscribing said shaft between said shaft and said laminated core, a pair of spider flanges engaging the opposite end faces of said laminated core to inhibit its axial displacement relative to said shaft, said dielectric sleeve securing said laminated core to said shaft and providing electrical insulation therebetween;
a slot liner disposed in each slot of said plurality of slots;
at least one insulating disc attached to said sleeve normal to said axis of rotation, said at least one insulating disc engaging one end of said laminated core and engaging said slot liners at said root end of said coil slot, said insulating disc inhibiting the axial displacement of said slot liners in at least one direction;
a commutator having a plurality of conductive elements concentrically arranged about said shaft, said commutator axially displaced from said laminated core; and
a plurality of coil windings, each coil winding of said plurality of coil windings having its ends connected to selected conductive elements of said commutator and entrained through selected coil slots of said laminated core.

2. The armature of claim 1 wherein each spider flange of said pair of spider flanges has a plurality of radially extending fingers, each finger of said plurality of fingers attached to a respective one end face of said plurality of radial arms.

3. The armature of claim 3 wherein said dielectric sleeve is a insulating thermosetting plastic sleeve molded directly between said shaft and said laminated core.

4. An armature for an electric motor comprising:
a shaft having an axis of rotation;
a laminated core circumscribing said shaft, said laminated core having a plurality of radial arms defining a plurality of coil slots therebetween, said coil slots having a root end and an open end;
a dielectric sleeve circumscribing said shaft between said shaft and said laminated core, a pair of spider flanges engaging the opposite end faces of said laminated core to inhibit its axial displacement relative to said shaft, said dielectric sleeve securing said laminated core to said shaft and providing electrical insulation therebetween;
a slot liner disposed in each slot of said plurality of slots;
at least one insulating disc attached to said sleeve normal to said axis of rotation, said at least one insulating disc engaging one end of said laminated core and engaging said slot liners at said root end of said coil slot, said insulating disc inhibiting the axial displacement of said slot liners in at least one direction;
a commutator having a plurality of conductive elements concentrically arranged about said shaft, said commutator axially displaced from said laminated core; and
a plurality of coil windings, each coil winding of said plurality of coil windings having its ends connected to selected conductive elements of said commutator and entrained through selected coil slots of said laminated core;
wherein said at least one insulating disc has an external diameter selected to engage said slot liner in the region adjacent to said root of said coil slots and further has a plurality of arcuate tabs defining an internal diameter, said internal diameter being less that the diameter of said sleeve adjacent to said laminated core so that when said insulating disc is displaced along said sleeve toward said laminated core, said arcuate tabs are deformed locking said insulating disc against an end face of said laminated core.

5. The armature of claim 4 wherein the periphery of said insulating disc is deformed to extend a short way into each of said coil slots.

6. The armature of claim 1 wherein said one end of said laminated core engaged by said insulating disc is the end opposite said commutator.

7. The armature of claim 1 wherein said at least one insulating disc comprises two insulating discs, one engaging a first end face of said laminated core and the other engaging an opposite end face of said laminated core.

8. An insulating disc for electrically insulating the coil windings for a laminated core of an armature, said armature having a shaft passing concentrically through said laminated core and an electrically insulating sleeve connecting said laminated core to said shaft, said laminated core having a plurality of longitudinal coil slots symmetrically disposed about a periphery of said laminated core, said longitudinal coil slots having internal ends defining a predetermined root diameter, said insulating disc having an external diameter greater than said root diameter and means for securing said insulating disc against one end face of said laminated core;

wherein said electrically insulating sleeve has a predetermined diameter adjacent to said one end face, said means for securing comprises a plurality of arcuate tabs, the internal ends of which define an internal diameter of said insulating disc smaller than said predetermined diameter of said insulating sleeve, said arcuate tabs deforming when said insulating disc is swagged on said electrically insulating sleeve to lock said insulating disc against said one end face of said laminated core.

9. The insulating disc of claim 8 wherein an outer periphery of said insulating disc is indented into each of said longitudinal coil slots.

10. The insulating disc of claim 8 wherein a slot liner is disposed in each of said longitudinal coil slots, said slot liners having an end adjacent to said one end face of said laminated core, said external diameter of said insulating disc is selected to engage said ends, said slot liners in the region of said internal ends of said longitudinal coil slots.

11. The insulating disc of claim 8 wherein said insulating disc is a rag paper disc.

12. The insulator disc of claim 8 further including a second insulating disc disposable against an end face of said laminated core opposite said one end face.

13. The insulating disc of claim 8 wherein said armature has a commutator disposed on said shaft on one side of said laminated core, said one face of said laminated core is a radial face on the end of said laminated core on the side opposite said commutator.

* * * * *

UNITED STATES PATENT AND TRADEMARK OFFICE
CERTIFICATE OF CORRECTION

PATENT NO. : 5,428,258

DATED : June 27, 1995

INVENTOR(S) : JOHN MOWERY

It is certified that error appears in the above-identified patent and that said Letters Patent is hereby corrected as shown below:

Column 1, Line 30

After "shaft" insert --and--.

Column 4, Line 17,

Delete 3 and insert -2--.

Column 4, Line 57, Claim 4

Delete "that" and insert --than--.

Signed and Sealed this

Tenth Day of October, 1995

Attest:

BRUCE LEHMAN

*Attesting Officer*   *Commissioner of Patents and Trademarks*